(12) United States Patent
Betush et al.

(10) Patent No.: US 7,290,710 B2
(45) Date of Patent: Nov. 6, 2007

(54) SYSTEM, METHOD, AND APPARATUS FOR PASSIVE, MULTI-SPECTRAL, OPTICAL IDENTIFICATION OF REMOTE OBJECTS

(75) Inventors: William J. Betush, Fort Worth, TX (US); James R. Reed, Fort Worth, TX (US); Russell G. Torti, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 289 days.

(21) Appl. No.: 10/645,029

(22) Filed: Aug. 21, 2003

(65) Prior Publication Data

US 2005/0040245 A1 Feb. 24, 2005

(51) Int. Cl.
*G06F 7/10* (2006.01)

(52) U.S. Cl. ................................... 235/454
(58) Field of Classification Search ............. 235/384, 235/468, 454, 400–411; 340/522; 367/128
See application file for complete search history.

(56) References Cited

U.S. PATENT DOCUMENTS

| 3,936,822 | A | * | 2/1976 | Hirschberg | ............... 340/522 |
| 5,734,343 | A | | 3/1998 | Urbish et al. | |
| 6,142,372 | A | * | 11/2000 | Wright | ............... 235/382 |
| 6,215,731 | B1 | * | 4/2001 | Smith | ............... 367/128 |
| 6,621,764 | B1 | * | 9/2003 | Smith | ............... 367/128 |
| 6,729,540 | B2 | * | 5/2004 | Ogawa | ............... 235/384 |
| 6,832,728 | B2 | * | 12/2004 | Kennedy | ............... 235/468 |
| 2003/0006170 | A1 | | 1/2003 | Lawandy | |

FOREIGN PATENT DOCUMENTS

WO          WO 02/03006          1/2002

\* cited by examiner

*Primary Examiner*—Daniel Stcyr
*Assistant Examiner*—April Taylor
(74) *Attorney, Agent, or Firm*—Bracewell & Giuliani LLP

(57) ABSTRACT

A system passively identifies objects at large distances with an integrated two-dimensional pattern, spectral tailoring, and an imaging system. Encoded information allows objects of various origin and configuration to be easily and rapidly identified by optical means, but is invisible to the naked eye. The devices used for detecting the objects may be ground-based, airborne, or even satellite-based, and can track engagements of such marked objects in real-time. A tailored reflective surface at a specific wavelength band is applied to the exteriors of the objects to form a unique signature. A scanning system passively records the light emanating from the signature in the specific band, and recognizes the signature to discern what the object is based on a database of information.

20 Claims, 4 Drawing Sheets

SYSTEM, METHOD, AND APPARATUS FOR PASSIVE, MULTI-SPECTRAL, OPTICAL IDENTIFICATION OF REMOTE OBJECTS

BACKGROUND OF THE INVENTION

1. Technical Field

The present invention relates in general to an improved object identification system and, in particular, to an improved system, method, and apparatus for passively identifying objects at long range with a multi-spectral, optical signature and detector.

2. Description of the Related Art

Current flight-based, object identification systems are active in that they require the objects-to-be-identified to emit an active, trackable signal in order to be identified. Typically, radio signals are emitted by the objects in order to identify them. The radio signals contain information about who and/or what the objects or equipment are. Unfortunately, these signals can be detected by other surveillance systems, including hostile systems, which can use the signals to track and destroy the equipment. Although active identification systems are workable, a passive system for identifying objects that does not require the objects to release any active signals whatsoever would be desirable.

SUMMARY OF THE INVENTION

One embodiment of a system, method, and apparatus constructed in accordance with the present invention, passively identifies objects at large distances by utilizing an integrated, two-dimensional pattern, spectral tailoring, and an imaging system. This encoded information allows objects of various origin and configuration to be easily and rapidly identified by optical means. Such objects may include equipment, aircraft (both airborne and grounded), tanks, etc. The present invention is somewhat analogous to a bar code in that it also may be used to track supplies, but is invisible to the naked eye. Thus, no intuitive knowledge can be gained by observing the information, which is a distinguishing feature with respect to low observable materials. The devices used for detecting the marked objects may be ground-based, airborne, or even satellite-based, and can track engagements of such marked objects in real-time.

The present invention uses a tailored reflective surface at a specific wavelength band. The material used to form the reflective surface only reflects energy in a very narrow wavelength band. For example, the width of the wavelength band may be only one-half wavelength. The engineered material may be sprayed on an object like a paint, or adhered to the object as a decal or appliqué, and provides the object with a unique signature. At most, the signature appears on the object as a clear decal but is otherwise invisible to the human eye. The signature is located on an exterior surface of the object and also may be formed in a particular pattern or symbol, such as a star, bars, etc. However, the present invention is not limited by the type of symbol used and may use no intentional pattern or symbol whatsoever. Configuring the signature in a designated pattern merely broadens the use of each wavelength band. The signature is designed to be distinguishable from other signatures at a required distance for the resolution capability of a particular detector or scanner. Alternatively, the invention may comprise simply identifying different types of equipment with different wavelength bands.

The objects are scanned by a scanner that can detect the narrow wavelength band of each of the signatures on the objects. The wavelength bands are designed such that they do not lie in the threat bands or zones of hostile guided weapons or other detectors. Threat bands are loosely defined as any band of electromagnetic energy in which a threat (missile, RADAR, etc.) can detect the target (aircraft, tank, etc.). Many different wavelength bands are used to distinguish between different types of equipment. The scanning system passively records the light emanating from the signature in the specific band, and recognizes the signature to discern what the object is based on a database of information.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
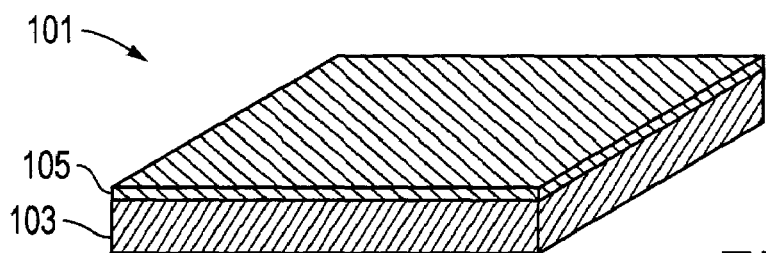
FIG. 1 is a schematic drawing of one embodiment of a signature constructed in accordance with the present invention.

Referring to FIG. 1, one embodiment of a signature 101 constructed in accordance with the present invention is shown. The signature 101 is part of a system that is designed to reflect light, such as infrared light, at very limited wavelengths in order to remotely identify an object.

Figure 2:
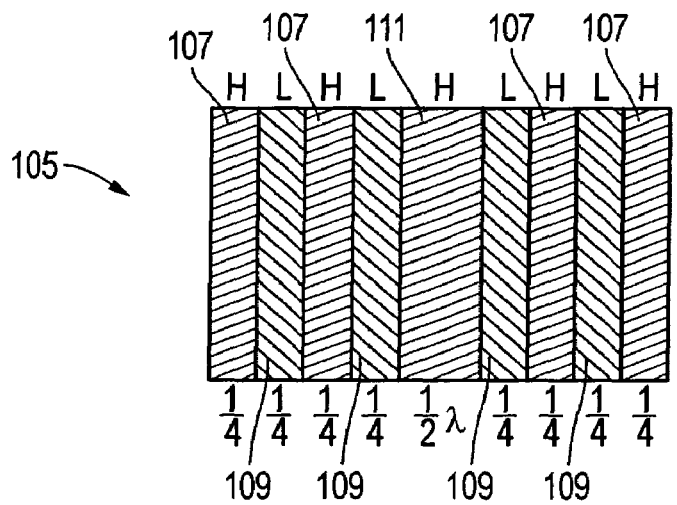
FIG. 2 is a sectional side view of the signature of FIG. 1.

Signature 101 comprises a laminate of materials having a substrate 103, such as Mylar, and a thin film 105 mounted on a surface of the substrate 103. As shown in FIGS. 1 and 2, the thin film 105 may comprise a dielectric, vapor-deposited, multi-layer laminate. In the embodiment of FIG. 2, the thin film 105 comprises a plurality of layers 107 having a high index of refraction that are interleaved with a plurality of layers 109 having a low index of refraction. Each of the layers 107, 109 has a thickness of one-quarter wavelength, other than a center, high index layer 111, which has a thickness of one-half wavelength.

Figure 3:
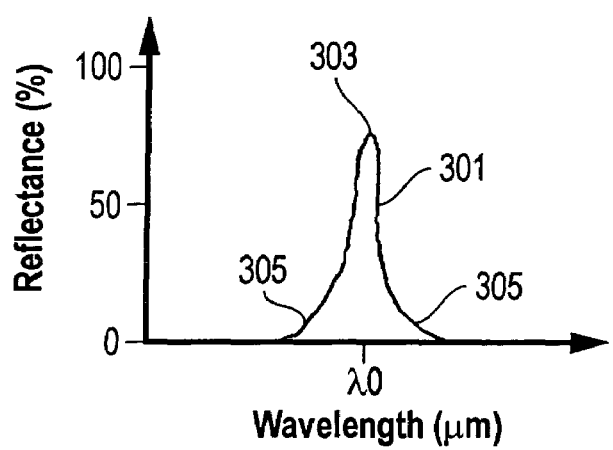
FIG. 3 is a plot of wavelength band versus reflectance for the signature of FIG. 1.

The properties and characteristics of the wavelength bands utilized by the present invention may be described in several ways. FIG. 3 depicts a plot 301 of wavelength band versus reflectance for the signature 101 of FIG. 1. The value of the reflectance of the wavelength band is dependent upon the number of layers 107, 109, 111 in the signature 101, as described above. As illustrated in FIG. 3, the peak reflectance 303 may range from 50 to 100% reflectance, as compared to the reflectance 305 of the structure on which signature 101 is located, which may only have a value of approximately 10% reflectance.

Figure 4:
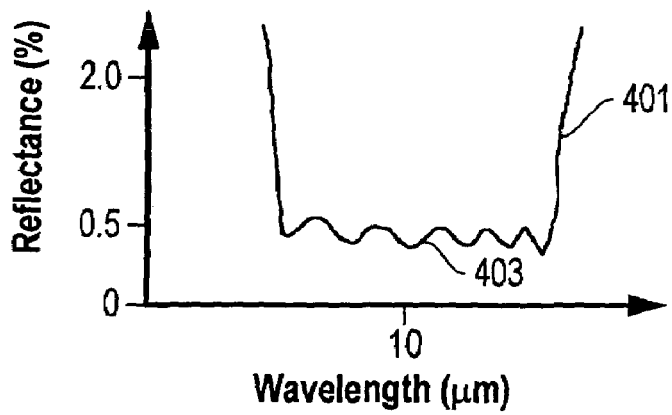
FIG. 4 is an alternative plot of wavelength band versus reflectance for the signature of FIG. 1.

FIG. 4 depicts an alternative configuration or plot 401 of wavelength band versus reflectance for signature 101. Plot 401 illustrates the effect of the quarter-wave stack design of the thin film 105 (FIG. 2) on reflectance. As shown in FIG. 4, signature may be configured with an unusually low reflectance (valley 403) on the order of only one-half percent (0.5%) reflectance as compared to the relatively higher reflectance of approximately 10% of the structure (see FIG. 3) on which signature 101 is located.

Figure 5:
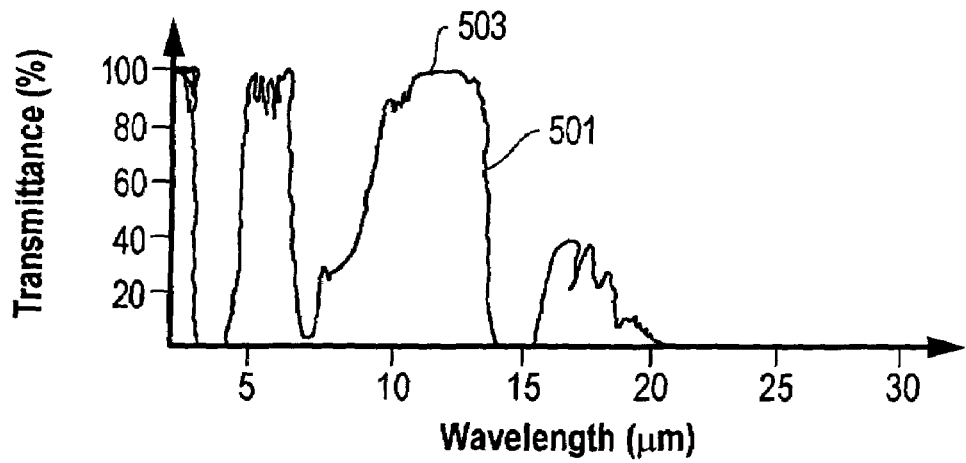
FIG. 5 is a plot of a wavelength band versus atmospheric transmittance for the signature of FIG. 1.
Figure 6:
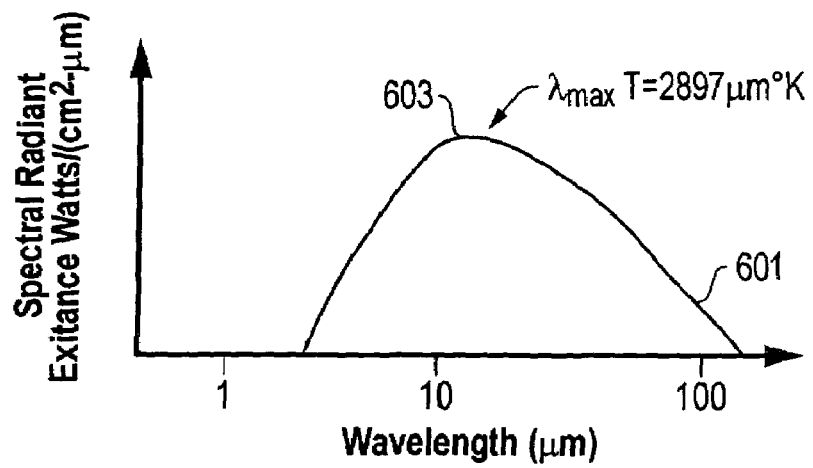
FIG. 6 is a plot of a wavelength band versus spectral radiant exitance for blackbody radiation of the signature of FIG. 1.

FIG. 5 depicts a plot 501 of wavelength versus percentage of atmospheric transmittance (smoothed) for signature 101. The portion 503 of plot 501 illustrates the transmittance of thin film 105. FIG. 6 is a plot 601 of a wavelength band versus spectral radiant exitance for blackbody radiation of signature 101. The portion 603 of plot 601 illustrates that the maximum exitance occurs at $\lambda max*T=2897$ μm° K.(10 μm at 300° K.=room temperature).

Figure 7:
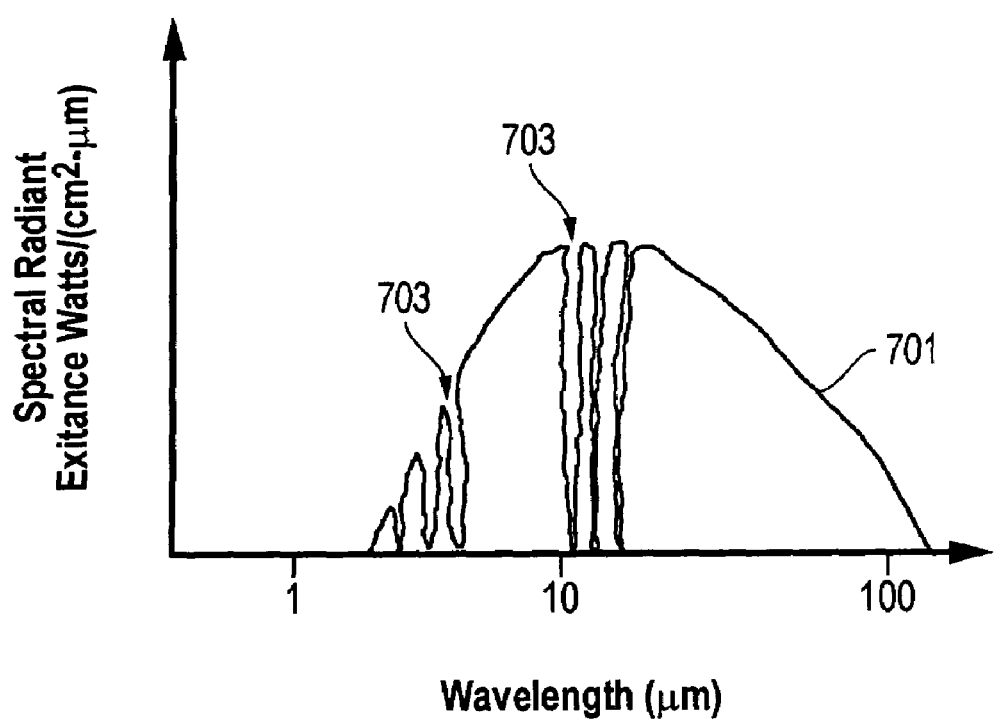
FIG. 7 is a plot of a wavelength band versus spectral radiant exitance for a hyper-spectral design of the signature of FIG. 1.

FIG. 7 depicts a plot 701 of wavelength versus spectral radiant exitance for a hyper-spectral design of the signature 101 of FIG. 1. The portions 703 of plot 701 illustrate multiple absorption lines having very narrow, half-wave bandwidths. Prior art detectors or sensors, which utilize "band averaging" techniques, are unable to detect these very narrowly separated absorption lines.

Figure 8:
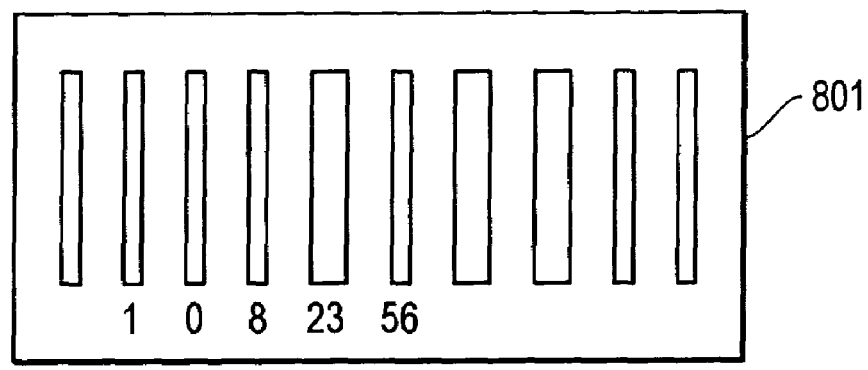
FIG. 8 is a plan view of an alternate embodiment of a signature constructed in accordance with the present invention.

FIG. 8 is a plan view of an alternate embodiment of a signature 801 constructed in accordance with the present invention. Signature 801 is somewhat analogous to a bar code configuration. Although signature 801 is invisible to the naked eye, it can be detected and identified remotely at great distances when applied to an exterior surface of an object.

Figure 9:
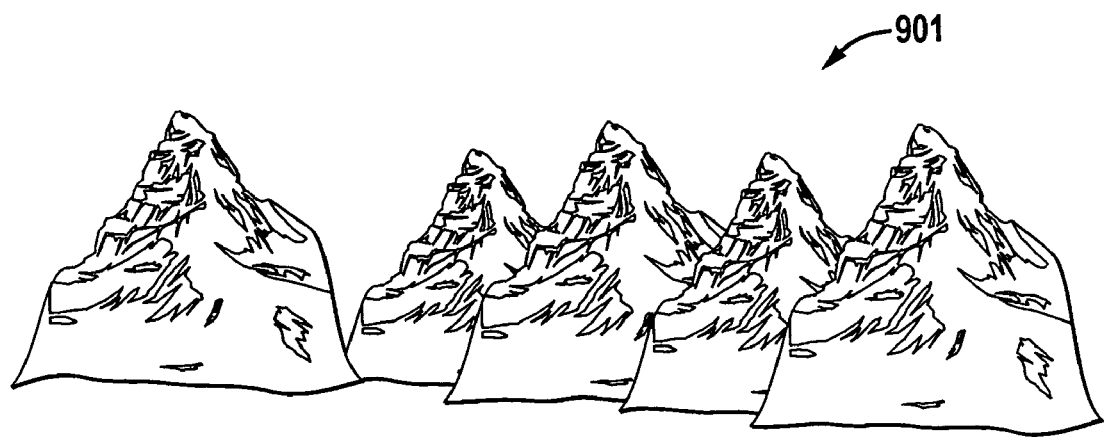
FIG. 9 is a schematic, operational diagram of a passive identification system constructed in accordance with the present invention.
Figure 9:
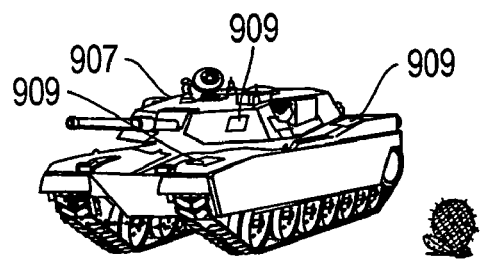
Figure 9:
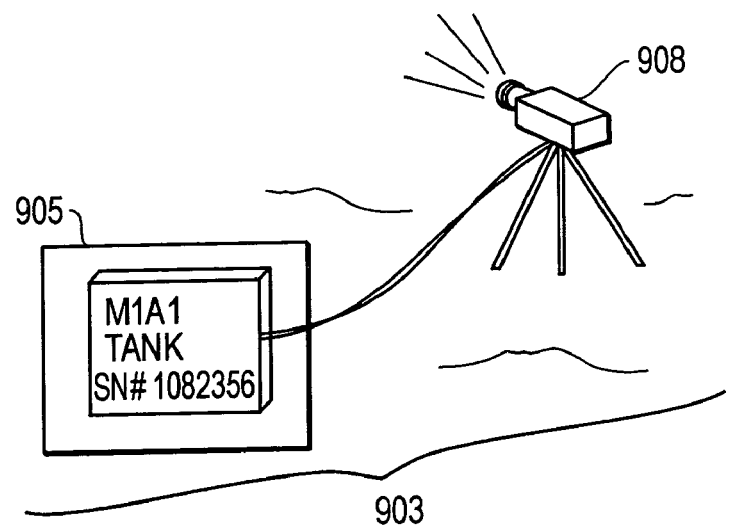

FIG. 9 is a schematic, operational diagram of a passive identification system 901 constructed in accordance with the present invention. The system 901 is designed to passively and remotely identify objects 907 with appropriate software. The system 901 identifies objects such as equipment, airborne aircraft, grounded aircraft, tanks, etc. The system 901 is also capable of tracking engagements of the objects and movement of supplies to and from the objects in real-time.

The system 901 utilizes a series of signatures 909, which may comprise signatures 101, 801 (described above). The signatures 909 are positioned on exterior surfaces of a plurality of the objects 907. In one embodiment, each of the signatures 909 has an encoded, two-dimensional, reflective configuration that is spectrally tailored to define a unique signature for each of the objects 907. A material used to form the reflective surfaces of the signatures 909 only reflects energy in wavelength band widths of approximately one-half wavelength. The signatures 909 may utilize patterns and symbols to further distinguish between the objects 907. The signatures 909 may be, for example, painted on the objects 907, and/or adhered to the objects 907 as appliqué. The signatures 909 are invisible to the naked human eye such that no intuitive knowledge can be gained by human observation of the signatures 909.

The system 901 also comprises an optical imaging system 903 for remotely and passively detecting and decoding the signatures 909 and thereby identifying the objects 907 based on the signatures 909. A portion of the optical imaging system 903 may utilize existing sensors 908, such as those known in the art. The optical imaging system 903 has a scanning system 905 that passively records the light, such as infrared light, emanating from the signatures 909 in respective, specific wavelength bands. The optical imaging system 903 recognizes the signatures 909 to discern what the objects 907 are based on a database of information in the software. The wavelength bands are encoded to lie outside of threat bands of hostile detectors and hostile guided weapons. However, the scanning system 908 may be positioned remotely at ground-based, airborne, and/or satellite-based positions.

The present invention has several advantages, including the ability to passively identify objects at large distances by utilizing an integrated, two-dimensional pattern, spectral tailoring, and an imaging system. This encoded information allows objects of various origin and configuration to be easily and rapidly identified by optical means. The present invention also track supplies while remaining invisible to the naked eye so that no intuitive knowledge can be gained by observing the information. This feature is particularly valuable with respect to low observable materials. Ground-based, airborne, or even satellite-based devices can be used to identify and track engagements of objects in real-time.

A tailored reflective surface at a specific wavelength band is used to identify the objects. The material that forms the reflective surface only reflects energy in a very narrow wavelength band. The engineered material may be painted on an object or adhered to the object as a decal to provide the object with a unique signature. The signature is located on an exterior surface of the object and also may be formed in a particular pattern or symbol, such as a star or bars. The signatures are designed to be distinguishable from other signatures at great distances, and they do not lie in the threat zones of unauthorized detectors. Many different wavelength bands may be used to distinguish between different types of equipment. The system uses a database of information to passively record and recognize the light emanating from the signatures to discern the objects.

While the invention has been shown or described in only some of its forms, it should be apparent to those skilled in the art that it is not so limited, but is susceptible to various changes without departing from the scope of the invention.

What is claimed is:

1. A system for passively and remotely identifying objects, comprising:

a series of signatures positioned on exterior surfaces of a plurality of objects, each of the signatures having an encoded, two-dimensional, reflective configuration that is spectrally tailored to define a unique signature for each of the objects; and an optical imaging system for remotely and passively detecting and decoding the signatures and thereby identifying the objects based on the signatures, the optical imaging system having a scanning system that passively detects light emanating from the signatures in respective, specific wavelength bands, and recognizes the signatures to discern what the objects are based on a database of information.

2. The system of claim 1, wherein a remote position of the scanning system is selected from the group consisting of airborne and satellite-based.

3. The system of claim 1, wherein a material used to form reflective surfaces of the signatures only reflects energy in wavelength band widths of approximately one-half wavelength.

4. The system of claim 1, wherein the signatures utilize patterns and symbols to further distinguish between the objects, and the wavelength bands are encoded to lie outside of threat bands of hostile detectors and hostile guided weapons.

5. The system of claim 1, wherein the signatures are painted on the objects.

6. The system of claim 1, wherein the signatures are invisible to the naked human eye such that no intuitive knowledge can be gained by human observation of the signatures, and the objects comprise airborne aircraft, grounded aircraft, and tanks.

7. The system of claim 1, wherein the system tracks engagements of the objects and movement of supplies to and from the objects in real-time.

8. The system of claim 1, wherein
each of the signatures includes a substrate and a thin film mounted on a surface of the substrate, the thin film comprising a laminate including a plurality of layers having a high index of refraction that are interleaved with a plurality of layers having a low index of refraction, each of the layers having a thickness of approximately a fraction of a wavelength of the light to define the wavelength band for the unique signature; and
a value of a reflectance of the wavelength band is dependent upon the number of layers in the signature.

9. The system of claim 8, wherein the wavelength band has multiple absorption lines having a very narrow, approximately half-wave bandwidth that is undetectable by sensors that utilize band averaging techniques.

10. The system of claim 8, wherein:
the signature utilizes a bar code configuration that is invisible to the naked human eye and can be detected and identified remotely when applied to an exterior surface of an object;
the light reflected by the signature is infrared light; and
the thin film is a dielectric and vapor-deposited on the substrate.

11. The system of claim 8, further comprising a center layer having a high index of refraction and located between the layers, the center layer also having a thickness that is greater than the thickness of the layers; and
the thickness of each of the layers is approximately one-quarter wavelength, and the thickness of the center layer is approximately one-half wavelength.

12. The system of claim 8, wherein a peak reflectance of the signature is in a range from 50 to 100% reflectance, which is higher than a reflectance of a structure on which the signature is located, and a minimum reflectance of the signature is approximately one-half percent reflectance, which is lower than the reflectance of the structure on which the signature is located.

13. A system for passively and remotely identifying an object, comprising:
a signature positioned on an exterior surface of an object, the signature comprising a substrate and a thin film mounted on a surface of the substrate, the thin film including a laminate including a plurality of layers having a high index of refraction that are interleaved with a plurality of layers having a low index of refraction; and
an optical imaging system for remotely and passively detecting and decoding the signature and thereby identifying the object based on the signature, the optical imaging system having a scanning system that passively detects light emanating from the signature in a wavelength band, and recognizes the signature to discern what the object is based on a database of information.

14. The system of claim 13, wherein each of the layers has a thickness of approximately a fraction of a wavelength of the light to define the wavelength band, and the thin film is a dielectric and vapor-deposited on the substrate.

15. The system of claim 13, wherein:
the signature utilize patterns and symbols to further distinguish between the objects, and the signature is adhered to the objects as appliqué; and
a peak reflectance of the signature is in a range from 50 to 100% reflectance, which is higher than a reflectance of a structure on which the signature is located, and a minimum reflectance of the signature is approximately one-half percent reflectance, which is lower than the reflectance of the structure on which the signature is located.

16. The system of claim 13, wherein the signature is painted on the objects and the signature is invisible to the naked human eye such that no intuitive knowledge can be gained by human observation of the signature.

17. The system of claim 13, wherein the objects comprise equipment, airborne aircraft, grounded aircraft, and tanks, and the system tracks engagements of the objects and movement of supplies to and from the objects in real-time.

18. The system of claim 13, wherein the wavelength band has multiple absorption lines having a very narrow, approximately half-wavelength bandwidth that is undetectable by sensors that utilize band averaging techniques.

19. The system of claim 13, further comprising a center layer having a high index of refraction and located between the layers, the center layer also having a thickness that is greater than the thickness of the layers.

20. The system of claim 19, wherein the thickness of each of the layers is approximately one-quarter wavelength, and the thickness of the center layer is approximately one-half wavelength.

* * * * *